US007546759B1

(12) United States Patent
Gruenfelder et al.

(10) Patent No.: US 7,546,759 B1
(45) Date of Patent: Jun. 16, 2009

(54) CHEMICAL/BIOLOGICAL HOSE TEST ADAPTER

(75) Inventors: Nicole L. Gruenfelder, Baltimore, MD (US); Chika N. Nzelibe, Catonsville, MD (US); Joshua D. Israel, Baltimore, MD (US); Lowry J. Brooks, Jr., Fallston, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 314 days.

(21) Appl. No.: 11/688,641

(22) Filed: Mar. 20, 2007

(51) Int. Cl.
*G01M 3/04* (2006.01)
*G01M 3/02* (2006.01)

(52) U.S. Cl. ................................................ 73/40; 73/37

(58) Field of Classification Search ...................... 73/40
See application file for complete search history.

(56) References Cited

U.S. PATENT DOCUMENTS 7,415,864 B1 * 8/2008 Israel et al. .................. 73/1.02

* cited by examiner

*Primary Examiner*—Tung S Lau
*Assistant Examiner*—Nathaniel Kolb
(74) *Attorney, Agent, or Firm*—Ulysses John Biffoni

(57) ABSTRACT

The invention relates to devices and methods for adapting a standard protective mask test apparatus to perform leak testing of a mask air hose assembly as an independent equipment component, i.e., independent of the mask-hose system.

15 Claims, 2 Drawing Sheets

CHEMICAL/BIOLOGICAL HOSE TEST ADAPTER

GOVERNMENT INTEREST

The invention described herein may be manufactured, licensed, and used by or for the U.S. Government.

TECHNICAL FIELD

The present invention relates generally to leak testing of mask air hose assemblies, and more particularly to devices and methods for adapting a standard mask testing apparatus to perform leak testing of mask air hose assemblies independently of the mask systems to which they may be attached.

BACKGROUND

A number of protective masks are equipped with air hose assemblies to enable the mask to be attached to a separable filter canister, an external air supply, or a portable air purification system. For example the M40A1/M42A1 Joint Forces CB protective masks include standard North American Treaty Organization (NATO) threaded fittings on one or both sides of the mask to enable the wearer to attach a hose assembly or mount a NATO compatible canister, as needed. The Joint Service Mask Leakage Tester (JSMLT) is a portable device used to test the serviceability and proper fit of chemical and biological (CB) protective masks. The JSMLT is designed to test a large number of masks for leaks to a very high degree of certainty as rapidly and reliably as possible. Because such testing frequently may be conducted in the field by operators under duress and/or having limited experience with the test equipment it is important that leak testing devices and procedures be as simple and as reliable as possible. While the JSMLT and similar protective mask test devices are able to perform a number of tests on a variety of different mask systems, such mask test devices lack the capability to test removable air hose assemblies as independent equipment components. Instead, air hose assemblies must be tested by a "mask-hose system" test in which the hose remains attached to the mask. Testing the hose as part of the "mask-hose system" makes it difficult to isolate air hose faults as a source of a leak. These test deficiencies may result in premature disposal of mask systems, decreased confidence in test procedures and decreased confidence in protective mask systems. Such unreliable testing also invariably increases the risk that defective air hose assemblies may be returned to service.

SUMMARY

In general, in one aspect, an embodiment of a device for testing an air hose assembly for a chemical/biological mask includes an adapter for testing a hose with a mask test apparatus as an independent component part. The adapter provides a first end with an opening and a second end with an opening. The first end has a threaded receptacle to accept a standard male NATO threaded hose coupling and the second end provides a stem that extends outwardly from the receptacle and is dimensioned for insertion and substantially airtight coupling into a headform pneumatic test port of the mask test apparatus. The stem of the hose test adapter preferably extends angularly from the axis of rotation of the receptacle at an angle of approximately 45 degrees. In another aspect, the body of the hose test adapter is of unitary construction and may be formed by an injection molding process from Zytel 77G33L or similar.

DETAILED DESCRIPTION

In the following detailed description, reference is made to the accompanying drawings. The drawings forms a part of this invention disclosure and show, by way of illustration, specific embodiments in which the invention, as claimed, may be practiced. The invention may, however, be embodied in many different forms and should not be construed as limited to the embodiments set forth; rather, these embodiments are provided so that this disclosure will be thorough and complete, and will fully convey the scope of the invention to those skilled in the art. As will be appreciated by those of skill in the art, the present invention may be embodied in methods and devices. Wherever possible, the same reference numbers will be used throughout the drawings to refer to the same or like parts.

Figure 3:
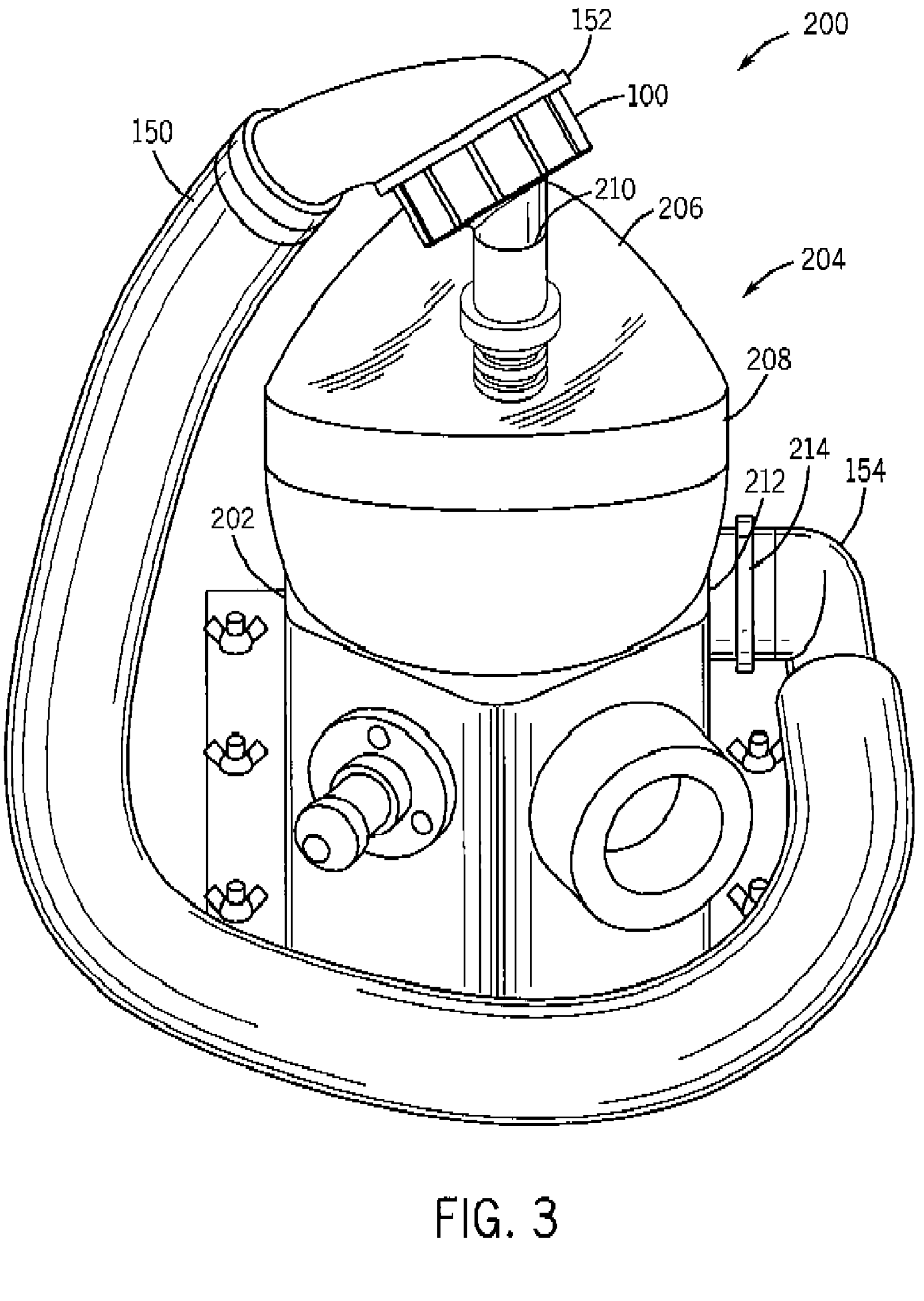
FIG. 3 is a diagram of a Joint Service Mask Tester equipped with the hose test adapter of FIG. 1 and configured for testing of a standard NATO threaded chemical-biological mask hose as an independent component part.

Embodiments of hose test adapters according to the present invention are designed for use in connection with protective mask leak test apparatus such as the Joint Forces TDA-99M or TDA-99B, or similar. A simplified schematic of a portable protective mask leakage test apparatus 200 is shown in FIG. 3. Mask test apparatus 200 provides leak and serviceability testing of a variety of sizes and types of negative pressure Chemical, Biological and Radiological protective masks without requiring an operator to actually don the mask. Leak testing of a mask essentially involves removing the gas canister from the mask, plugging the mask canister port and outlet valve, and affixing the mask by its own harness to points of attachment on test apparatus 200 so that it fits snugly over a face-shaped headform 204. An inflatable bladder 208 of headform 204 engages the faceseal on the mask and simulates the seal characteristics of the face of a user. If the mask is equipped with an air hose, the canister is removed from the hose end and the hose end is attached to a hose test port 212 on the test apparatus 200 via a threaded adapter 214. After the mask has been thusly secured, a slight vacuum is applied through headform 204 to the interior of the mask. Test apparatus 200 then monitors for leaks in the mask and any attached hose while the operator performs a number of test challenges. However, since the entire mask-hose system must be tested, isolating faults or leaks in the air hose assembly is very difficult.

Mask test apparatus 200 is equipped with two headforms 204 to accommodate masks of different sizes. The headforms 204 are push-fit mounted to a headform mounting pedestal 202 on test apparatus 200. Pedestal 202 and headform 204 are joined at an interface that includes four push-fit o-ring sealed pressure couplings (not shown). One such pressure coupling communicates a source of negative air pressure to a head test port 210 in the top of headform 204. Mask test apparatus 200 delivers negative air pressure to the mask under test through head test port 210 while the mask is probed for leaks.

Figure 1:
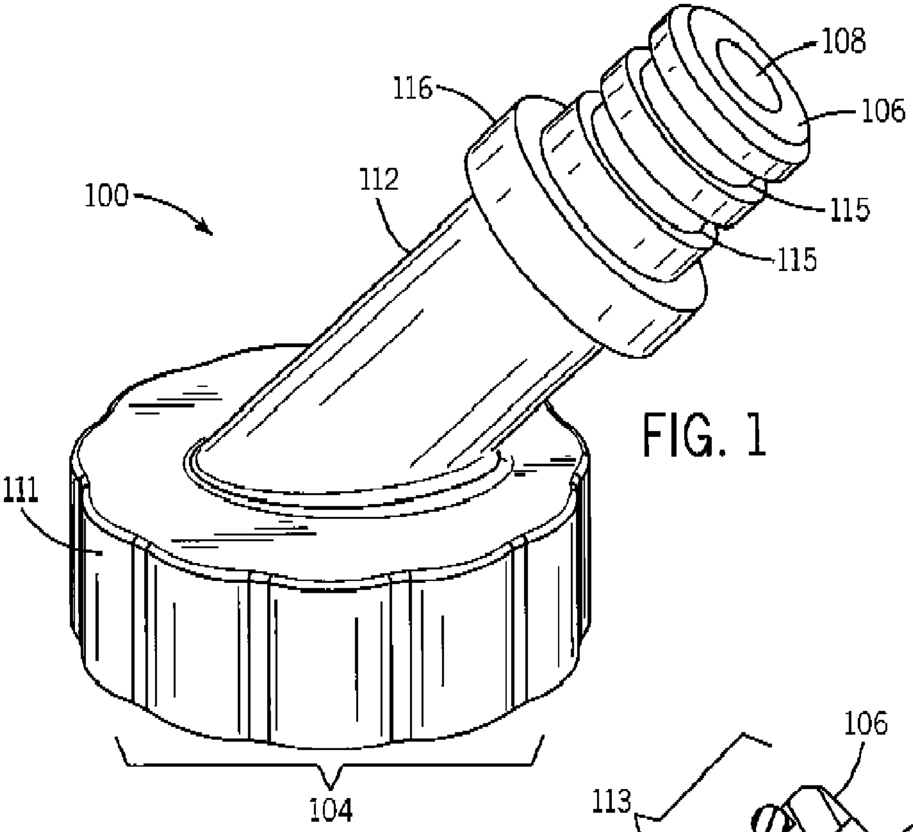
FIG. 1 is a perspective view the preferred embodiment of a hose test adapter according to the present invention.
Figure 2:
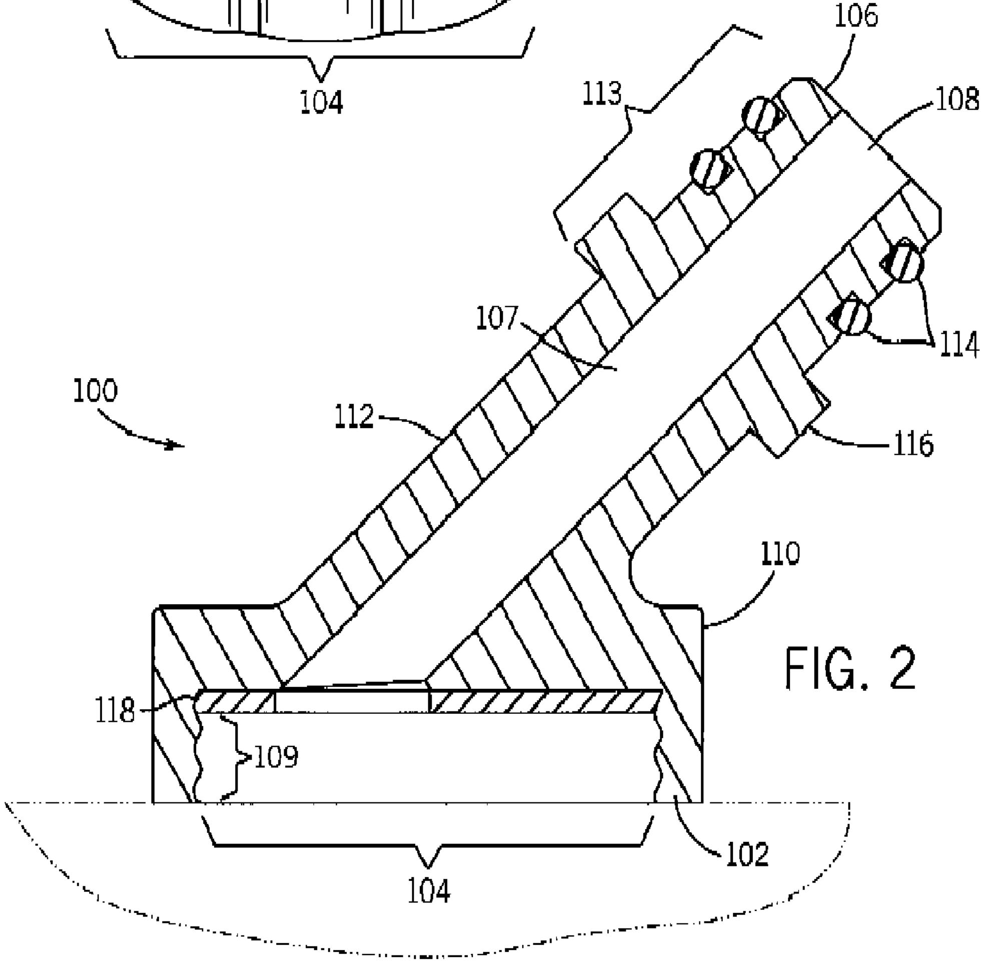
FIG. 2 shows a side sectional view of the hose test adapter of FIG. 1.

FIG. 1 shows a side sectional view of a preferred exemplary embodiment of an air hose test adapter (hose test adapter) 100 according to the present invention. Hose test adapter 100 is configured to adapt a standard NATO threaded male pneumatic fitting used for attachment of a NATO threaded mask end fitting 152 of flexible air hose 150 into head test port 210 of mask test apparatus 200. Hose test adapter 100 comprises a body having a first end 102 with a first opening 104 and a second end 106 with a second opening 108 and a passage 107 between the first opening 104 and second opening 108 to enable air to flow through. First end 102 provides a cap shaped NATO threaded receptacle 110 that engages a standard male NATO threaded air hose coupling. An annular seal 118 such as a standard M-45 canister/air hose gasket is disposed in threaded receptacle 110 to prevent leakage of air. The outside surface of receptacle 110 preferably has a knurled surface 111 to aid in gripping hose test adapter 100.

Second end 106 of hose test adapter 100 provides a tubular stem 112 that extends outwardly from the back of receptacle 110 and terminates at a tip 113 that is preferably chamfered to facilitate insertion of stem 112 into head test port 210. The external diameter of stem 112 is preferably 0.710 inches, dimensioned for snug push-fit coupling into head test port 210. The internal diameter of stem 112 is at least 0.325 inches throughout to provide unrestricted air flow through the hose to be tested. A pair of o-rings seals 114, or similar circumferential pneumatic seals, are disposed in 0.12 inch radial grooves 115 near tip 113. The first groove is located 0.15 inches from tip 113 and the second 0.55 from tip 113. While a single o-ring seal may be employed, dual o-ring seals 114 provide an added measure of assurance that air will not leak from head test port 210. A radial flange 116 approximately 0.25 inch thick and 0.975 inch in diameter is positioned 0.710 inch from tip 113 to prevent over-insertion of stem 112 into head test port 210. Stem 112 extends from the axis of rotation of receptacle 110 at an angle of approximately 45 degrees so that air hose 150 is oriented at approximately the same angle as when it is attached to a mask.

The body of hose test adapter 100 is of unitary construction and preferably formed by an injection molding process from Zytel 77G33L or similar hard plastic material.

Operation of a preferred embodiment according to the present invention is substantially as follows. Headform 204 is mounted to mask test apparatus 200. Chamfered end 113 of stem 112 of hose test adapter 100 is inserted into head test port 210 of headform 204. Male NATO threaded mask end fitting 152 of air hose assembly 150 is threaded securely into receptacle 110 of hose test adapter 100. The canister end fitting 154 of air hose assembly 150 is connected via threaded adapter 214 into hose test port 212. As in a mask test, a predetermined negative air pressure is delivered by mask test apparatus 200 to bead test port 210. Test apparatus 200 then monitors for leaks in air hose assembly 150 while the operator performs a number of test challenges.

CONCLUSION

As has been shown, embodiments according to the present invention provide effective and efficient systems, methods and devices for adapting a standard mask testing apparatus to perform leak testing of mask air hose assemblies independently of the mask systems to which they may be attached. Embodiments according to the present invention simplify detection and isolation of mask air hose assembly leaks and increase confidence in test procedures and in protective mask systems generally. Various modifications to the described embodiments may be made without departing from the spirit and scope of the claimed invention. Accordingly, other embodiments are within the scope of the invention, which is limited only by the following claims.

What is claimed is:

1. A device for adapting a chemical-biological mask test apparatus to testing of a mask air hose assembly as an independent equipment component, comprising:
- a body having a first end with an opening which provides a threaded receptacle to accept a standard mask air hose coupling; and
- a second end with an opening in fluid communication with the opening at the first end that provides a stem extending outwardly from the receptacle and is dimensioned for push-fit insertion and substantially airtight coupling into a head test port of the chemical biological mask test apparatus.

2. The device of claim 1, wherein the threaded receptacle accepts a standard male NATO threaded coupling.

3. The device of claim 1, further comprising an annular seal interposed between the threaded receptacle and the hose coupling.

4. The device of claim 1, wherein the stem is disposed at an angle from the axis of rotation of the receptacle.

5. The device of claim 4, wherein the stem of the hose test adapter extends at an angle of approximately 45 degrees.

6. The device of claim 1, further comprising an o-ring seal disposed in an annular groove on the stem.

7. The device of claim 6, further comprising a second adjacent o-ring seal on the stem.

8. The device of claim 6, further comprising an annular flange positioned above the o-ring seal to provide a seat to prevent over-insertion of the stem into the head test port.

9. The device of claim 1, wherein the body is formed by an injection molding process.

10. The device of claim 1, wherein the body comprises a rigid plastic material.

11. A method for leak testing an air hose for a chemical-biological mask as an independent equipment component, comprising:
- providing a chemical-biological mask leak test apparatus comprising a pedestal for mounting of a mask test headform and a plurality of pneumatic test ports;
- pneumatically coupling a headform comprising a head test port to a first pneumatic test port on the pedestal of the chemical biological mask leak test apparatus;
- providing an air hose to be tested for a chemical-biological mask, the air hose including a first end having a standard male NATO threaded fitting and a second end having a standard female NATO threaded fitting;
- providing a hose test adapter having an o-ring sealed stem dimensioned for insertion into the head test port on one end and having a NATO threaded receptacle on the other end;
- inserting the stem of the hose test adapter into the head test port of the headform;
- threading the male NATO threaded fitting into the NATO threaded receptacle of the hose test adapter;
- connecting the canister end of the hose to a second pneumatic test port on the chemical biological mask leak test apparatus;
- providing a negative air pressure to the air hose assembly through the mask test apparatus; and
- monitoring for leaks in the air hose assembly with the mask test apparatus.

12. The method of claim 11, wherein the male NATO threaded fitting is coupled into to the second pneumatic test port of the mask test apparatus via an adapter.

13. The method of claim 11, wherein the stem of the hose test adapter includes a second o-ring seal.

14. A device for adapting a chemical-biological mask test apparatus to testing of a mask air hose assembly as an independent equipment component, comprising:

a body having a first end with an opening which provides a threaded receptacle to accept a standard male NATO threaded mask air hose coupling;

a second end with an opening in fluid communication with the opening at the first end that provides a stem extending outwardly from the receptacle which is disposed at an angle from the axis of rotation of the receptacle and is dimensioned for push-fit insertion and substantially airtight coupling into a head test port of the chemical biological mask test apparatus;

an annular seal interposed between the threaded receptacle and the hose coupling;

a pair of o-ring seals disposed in annular grooves on the stem; and an annular flange positioned between the o-ring seals and the threaded receptacle to provide a seat to prevent over-insertion of the stem into the head test port.

15. The device of claim 14, wherein the body of the device is formed of a rigid plastic material in an injection molding process.

* * * * *